US010035531B2

(12) United States Patent
McVay

(10) Patent No.: US 10,035,531 B2
(45) Date of Patent: Jul. 31, 2018

(54) CART

(71) Applicant: Bridging Gaps, LLC, Olympia, WA (US)

(72) Inventor: Larry C McVay, Lacey, WA (US)

(73) Assignee: Bridging Gaps, LLC, Olympia, WA (US)

( * ) Notice: Subject to any disclaimer, the term of this patent is extended or adjusted under 35 U.S.C. 154(b) by 0 days.

(21) Appl. No.: 15/356,654

(22) Filed: Nov. 20, 2016

(65) Prior Publication Data
US 2017/0144685 A1 May 25, 2017

Related U.S. Application Data

(60) Provisional application No. 62/257,893, filed on Nov. 20, 2015, provisional application No. 62/297,120, filed on Feb. 18, 2016.

(51) Int. Cl.
*B62B 5/02* (2006.01)
*B62B 5/04* (2006.01)
(Continued)

(52) U.S. Cl.
CPC ............. *B62B 5/049* (2013.01); *B62B 3/02* (2013.01); *B62B 3/10* (2013.01); *B62B 3/104* (2013.01); *B62B 5/06* (2013.01); *B65H 75/22* (2013.01); *B65H 75/28* (2013.01); *B65H 75/285* (2013.01); *B65H 75/30* (2013.01); *B65H 75/403* (2013.01); *B65H 75/4468* (2013.01); *B62B 3/12* (2013.01);
(Continued)

(58) Field of Classification Search
CPC ......... B62B 5/049; B62B 3/06; B62B 3/0104; B65H 75/22; B65H 75/28; B65H 75/30; B65H 75/285; B65H 75/403
See application file for complete search history.

(56) References Cited

U.S. PATENT DOCUMENTS 4,768,546 A 9/1988 Brusadin et al.
5,109,882 A 5/1992 Eley
(Continued)

FOREIGN PATENT DOCUMENTS

DE 202013104100 11/2013
GB 519498 3/1940
WO 2011141050 11/2011

OTHER PUBLICATIONS

UPONOR Compact Select Uncoiler, part No. E6063000, Copyright 2011, published on www.uponorpro.com.
(Continued)

*Primary Examiner* — Sang K Kim

(57) ABSTRACT

The disclosure describes a cart having a frame, a front assembly attached to the frame, a back assembly attached to the frame, and a rotating enclosure assembly attached to the frame. The rotating enclosure assembly includes a removable side and a cage. The removable side is removable from the cage to aid in loading or unloading coils of flexible tubing and can be fixedly attached when installing the flexible tubing coiled around the rotating enclosure assembly. The cart may further include an adjustment mechanism that allows the cart to be adjusted between a mobile state and an immobile state. The back assembly may include one or more immobilizers configured to immobilize the cart into the immobile state.

16 Claims, 14 Drawing Sheets

(51) Int. Cl.
*B62B 3/02* (2006.01)
*B62B 3/10* (2006.01)
*B62B 5/06* (2006.01)
*B65H 75/22* (2006.01)
*B65H 75/28* (2006.01)
*B65H 75/30* (2006.01)
*B65H 75/40* (2006.01)
*B65H 75/44* (2006.01)
*B62B 3/12* (2006.01)

(52) U.S. Cl.
CPC ..... *B62B 2202/025* (2013.01); *B62B 2203/74* (2013.01); *B65H 2701/33* (2013.01)

(56) References Cited

U.S. PATENT DOCUMENTS

| | | |
|---|---|---|
| 5,308,011 A | 5/1994 | Roman |
| 5,462,298 A | 10/1995 | Bodine |
| 7,073,529 B1 | 7/2006 | Harkey |
| 8,590,825 B2 | 11/2013 | Franchini |
| 8,864,163 B1 | 10/2014 | Buvala |
| 9,179,611 B2 | 11/2015 | Korus et al. |
| 2002/0027178 A1 | 3/2002 | Lindermeir et al. |
| 2003/0080236 A1* | 5/2003 | Armstrong ........... B65H 16/005 242/557 |
| 2003/0085316 A1* | 5/2003 | Mostowy ............. B65B 13/185 242/557 |
| 2004/0245362 A1* | 12/2004 | Ast ...................... B65H 75/146 242/388.6 |
| 2008/0100013 A1 | 5/2008 | Yu Chen |
| 2011/0108655 A1* | 5/2011 | Boss ..................... B65H 49/32 242/419.5 |
| 2011/0220756 A1* | 9/2011 | Mosher ................ B65H 75/403 242/476.1 |
| 2016/0175906 A1 | 6/2016 | Butler |

OTHER PUBLICATIONS

UPONOR Select Uncoiler, part No. E6062000, published on http://bostonheatingsupply.com.
JC1 PEX Tubing Uncoiler, published on www.malcotools.com.
UPONOR Tube Uncoiler, part No. E6061000, published on http://www.uponorpro.com.
Eley Portable Hose Reel Cart, SKU 1043, published on www.eleyhosereels.com.

* cited by examiner

CART

RELATED APPLICATIONS

This application claims priority under 35 U.S.C. Section 119(e) to U.S. Provisional Application Ser. No. 62/257,893, filed on Nov. 20, 2015, entitled "Cart" and to U.S. Provisional Application Ser. No. 62/297,120, filed on Feb. 18, 2016, entitled "Cart," the disclosures of which are incorporated by reference herein in their entirety.

BACKGROUND

Installing flexible tubing is difficult due to the unwieldy nature of the flexible tubing. Typically, flexible tubing is available commercially in rolls of various lengths (e.g., 100 ft, 300 ft and 500 ft). Most installation jobs require at least two people and commonly three people. With each additional person, labor costs are increased. While one installer alone may install the flexible tubing for a particular job, the installer will most likely purchase the shortest roll length available for the job. The tubing that is not used is then unusable for other jobs because it is too short. This results in considerable waste after multiple jobs and ultimately results in a financial loss to the independent installer.

The present invention is directed at a cart for installing flexible tubing that allows an independent installer to perform a self install of the flexible tubing and that minimizes the waste of the flexible tubing.

SUMMARY

Embodiments of the disclosure are directed towards a cart having a frame, a front assembly attached to the frame, a back assembly attached to the frame, and a rotating enclosure assembly attached to the frame. The rotating enclosure assembly includes a removable side and a cage. The removable side is removable from the cage to aid in loading or unloading coils of flexible tubing and can be fixedly attached when installing the flexible tubing coiled around the rotating enclosure assembly. The cart may further include an adjustment mechanism that allows the cart to be adjusted between a mobile state and an immobile state. The back assembly may include one or more immobilizers configured to immobilize the cart into the immobile state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following disclosure describes a cart for installing flexible tubing that allows a single installer to easily and efficiently install tubing in a trench or without a trench. The mobile cart handles various lengths of tubing, thereby decreasing the waste when the mobile cart is used on multiple jobs.

Figure 1:
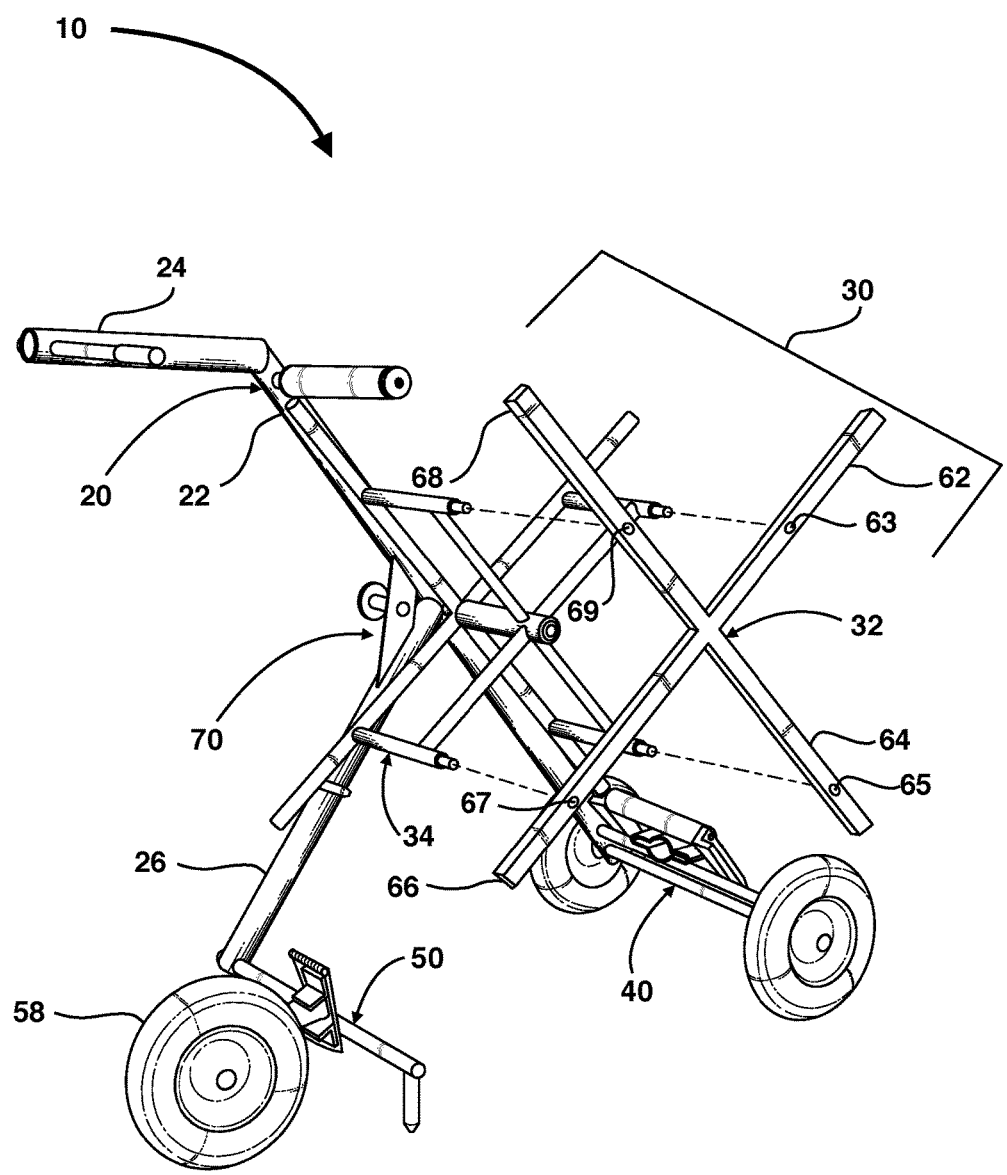
FIG. 1 is a perspective view of one embodiment of a cart illustrating a removable side of a rotating enclosure assembly that allows easy loading of a roll of flexible tubing onto the cart so that the cart can be used for installing flexible tubing in accordance with the principles of the present invention.

FIG. 1 is a perspective view of one embodiment of a cart 10 that can be used for installing flexible tubing in accordance with the principles of the present invention. The cart 10 includes a frame 20, a rotating enclosure assembly 30, a front assembly 40, and a back assembly 50. The frame 20 includes a first support member 22 attached to the front assembly 40 and extending vertically at an angle ending at a handle portion 24. The frame 20 further includes a second support member 26 attached to the back assembly 50 and extending at an angle vertically to attach to the first support member 22 approximately midway on the first support member 22. The rotating enclosure assembly 30 is attached to the frame 20 substantially laterally from the first support member 22 approximately midway. The cart 10 may further include a brake assembly 70 that prevents the rotating enclosure assembly 30 from free-wheeling, thereby preventing the flexible tubing from becoming loose around the rotating enclosure assembly 30 when the cart is transported or maneuvered to its desired location. The rotating enclosure assembly 30 includes a removable side 32 and a cage 34. The removable side 32 can be detached from the cage 34 to aid in loading rolls of flexible tubing in various lengths. The removable side 32 includes four removable side spokes 62, 64, 66, and 68 each having a respective removable side aperture 63, 65, 67, 69. In one embodiment, the removable side spokes are arranged in a perpendicular manner to each adjacent one, in a cross configuration. While FIG. 1 illustrates four removable side spokes, one skilled in the art will appreciate that an alternate number of removable side spokes may be used without departing from the scope of the claimed invention.

Figure 2:
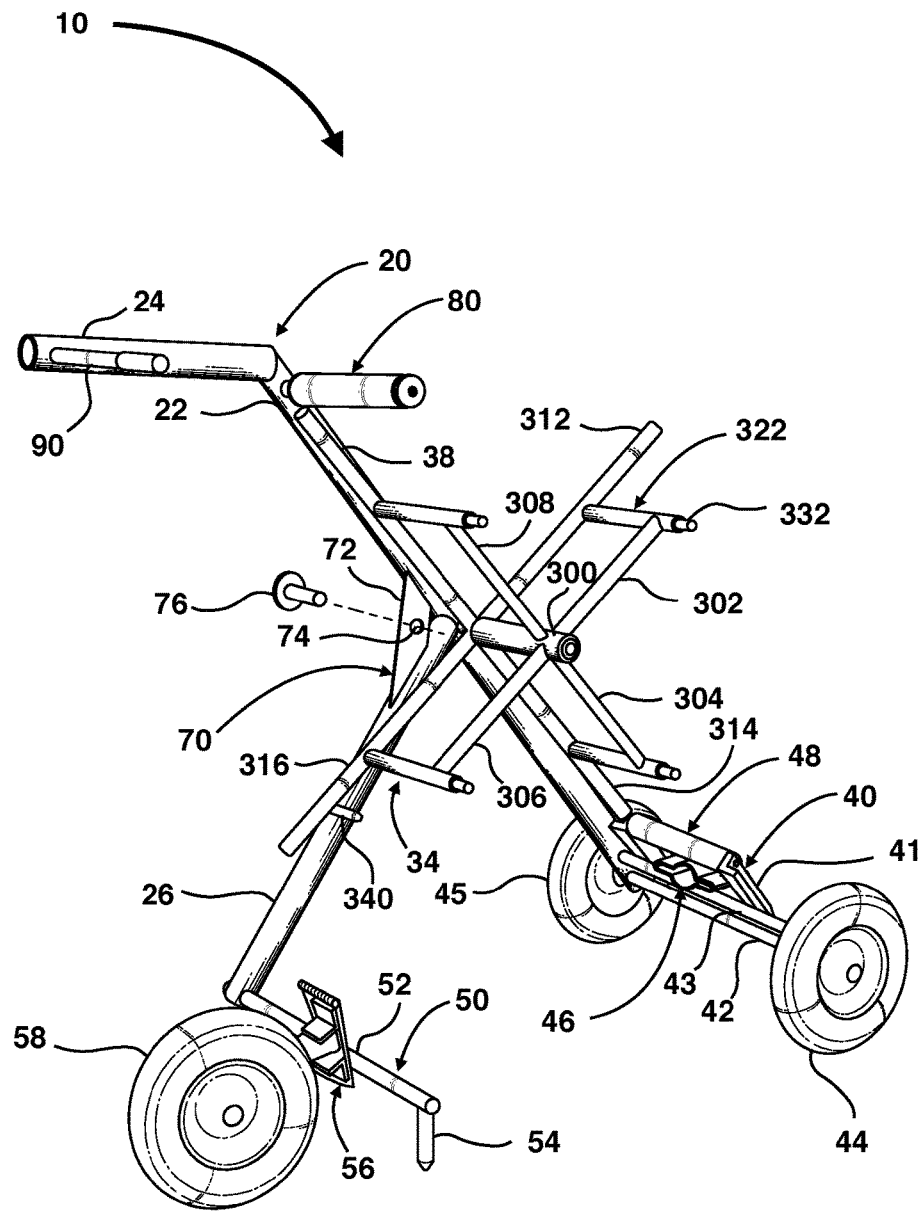
FIG. 2 is another perspective view of the cart illustrating a braking system for the rotating enclosure assembly.

FIG. 2 is another perspective view of the cart illustrating a braking system for the rotating enclosure assembly. In some embodiments, the cart 10 includes a brake assembly 70 that prevents the rotating enclosure assembly from freewheeling, thereby preventing the flexible tubing from becoming loose around the rotating enclosure assembly when the cart is transported or maneuvered to its desired location. In one embodiment, the brake assembly 70 may include a brake member 72 affixed between the first support member 22 and the second support member 26. The brake member 72 may include an aperture 74 that engages with a fastener 76 in a manner such that the brake assembly 70 prevents the rotating enclosure assembly from free wheeling backwards or forwards. In some embodiments, the aperture 74 may be a gap or hole in the brake member 72 and the fastener 76 may be a pin, such that when the pin is inserted through the hole, the pin contacts the rotating enclosure assembly and prevents the rotating enclosure assembly from free wheeling backwards or forwards. Other embodiments for the brake assembly 70 are envisioned using various mechanisms, such as bungee cords, metal clamps, clasps, or the like. Thus, the brake assembly 70 may be designed in various configurations, too numerous to enumerate, but each being effective to prevent the rotating enclosure assembly from free wheeling backwards or forwards. Each of these various configurations are within the scope of the present claims.

FIG. 2 also illustrates one embodiment for the front assembly 40 that may include a front axle 42 with front wheels 44,45 on opposite ends. In some embodiments, wheels 44, 45 may be non-deflatable wheels. The length of the front axle 42 may be sized to accommodate typical widths of trenches and may be sized in a manner to support various lengths of flexible tubing rolls loaded onto the cart 10. Attached to the front axle 42 and positioned above and substantially parallel to front axle 42 is a locking mechanism 46. Also attached to the front axle 42 and positioned above and substantially parallel to the locking mechanism 46 is a front roller 48. Both the locking mechanism 46 and the front roller 48 may be attached to one or more front support members 41 that are attached to a front support rod 43. In some embodiments, one end of the front support rod 43 is attached to the first support member 22 near a bottom of the first support member 22. The other end of the front support rod 43 may be attached to the front axle 42 by a connecting element 47 (shown in FIG. 3).

In some embodiments, the back assembly 50 may include a support bar 52 extending substantially parallel to front axle 42 and is attached laterally from the second support member 26 near its end. In some embodiments, the support bar 52 may include one or more immobilizers (e.g., spike 54), which may protrude downwardly from the support bar 52. In the configuration with spikes, the spikes allow an installer to immobilize the cart by inserting the spikes into the ground (e.g., by stepping on support bar 52). In other configurations, the immobilizers may be more permanent, such as being bolted to a truck bed when the flexible tubing is considerably larger and the cart is not required to be moved independently. In these configurations, the tires may no longer be needed, but the removable side allows the ability to load, reload, and wind various lengths of the flexible tubing. While these configurations may not have tires, tires may be included to easily unload the cart and tubing to another vehicle or for other uses. It is envisioned that other immobilizers may be designed to accommodate various terrains and surfaces. For example, immobilizers may be designed using suction cups, bolts, supports for adding weight onto the back assembly, or the like. In some embodiments, the back assembly 50 includes an adjustment mechanism 56 and a back wheel 58. Again, in some embodiments, the back wheel 58 may be a non-deflatable wheel. The adjustment mechanism 56 allows the back wheel 58 to float upwardly when the immobilizer (e.g., spikes inserted into the ground) contacts a surface in a desired manner. When the cart is in a mobile state (i.e., spikes not inserted into the ground), the back assembly 50 provides steering capability for the cart. The length of the spikes allows the spikes to remain higher than the bottom of the back wheel 58 and above the ground when the cart is mobile. The cart 10 may further include a back roller 80 and a handle bar 90 both attached to frame 20. In some embodiments, back roller 80 may be attached laterally to the first support member 22 and the handle bar 90 may be attached laterally to the handle portion 24. The back roller 80 keeps the flexible tubing confined within the rotating enclosure assembly and rotates when the flexible tubing contacts the back roller 80 as the flexible tubing winds or unwinds in the cart. The handle bar 90 provides a convenient mechanism to maneuver the cart by a single person.

In FIG. 2, the removable side has been removed from the rotating enclosure assembly to better illustrate the cage 34. In some embodiments, the cage 34 includes a center axis 300 with four shorter radial spokes 302-308 connected to the center axis 300 near a first end in a cross configuration and four longer radial spokes 312-318 connected to the center axis 300 at a second end forming a second cross configuration. Four connecting cross members (e.g., cross member 322) each connect one of the shorter radial spokes (e.g., shorter radial spoke 302) with a corresponding longer radial spoke (e.g., longer radial spoke 312). The connecting cross members extend past the first end of the center axis and have an end (e.g., end 332) which has a smaller diameter than the other portion of the connecting cross member 322. End 332 may be inserted through one of the removable side apertures (e.g., removable side aperture 63 illustrated in FIG. 1) of the removable side 32 and fastened, such as with a lynchpin (e.g., lynchpin 350 illustrated in FIG. 3) inserted through a hole in end 332 which protrudes from the other side of the removable side spoke (e.g., removable side spoke 62 illustrated in FIG. 1). In this embodiment, the lynchpins allow the removable side 32 to become removably fastened to the cage 34, which allows easy loading and unloading of flexible tubing rolls. In some embodiments, the removable side 32 may be attached to the cage 34 using one lynchpin for each removable side spoke. For convenience, all the lynchpins may include a fastener and the cart may include a holder for storing one or more fasteners so that the corresponding lynchpins do not get misplaced or lost. It is envisioned that other fastening techniques may be used to fasten the removable side to the cage 34 without departing from the present invention. The length of the longer radial spokes 312-318 along with the removable side spokes (not shown) prevent the flexible tubing from transversal movement outside the rotating enclosure assembly 30. The back roller 80 and the front roller 48 confine the flexible tubing from vertical movement outside the rotating enclosure assembly 30. Anchor 340 preferably positioned in a manner on one of the longer radial spoken spokes (e.g., longer radial spoke 316) secures an end of the flexible tubing when the flexible tubing is placed onto the anchor. In some configurations, an optional clamp may secure the flexible tubing around the anchor. The length of the longer radial spokes and the removable side spokes provides a user a convenient means to wind and unwind the flexible tubing without using a traditional handle and crank configuration. It is envisioned that other mechanisms for anchoring the tubing may be designed without departing from the scope of the present invention.

Figure 3:
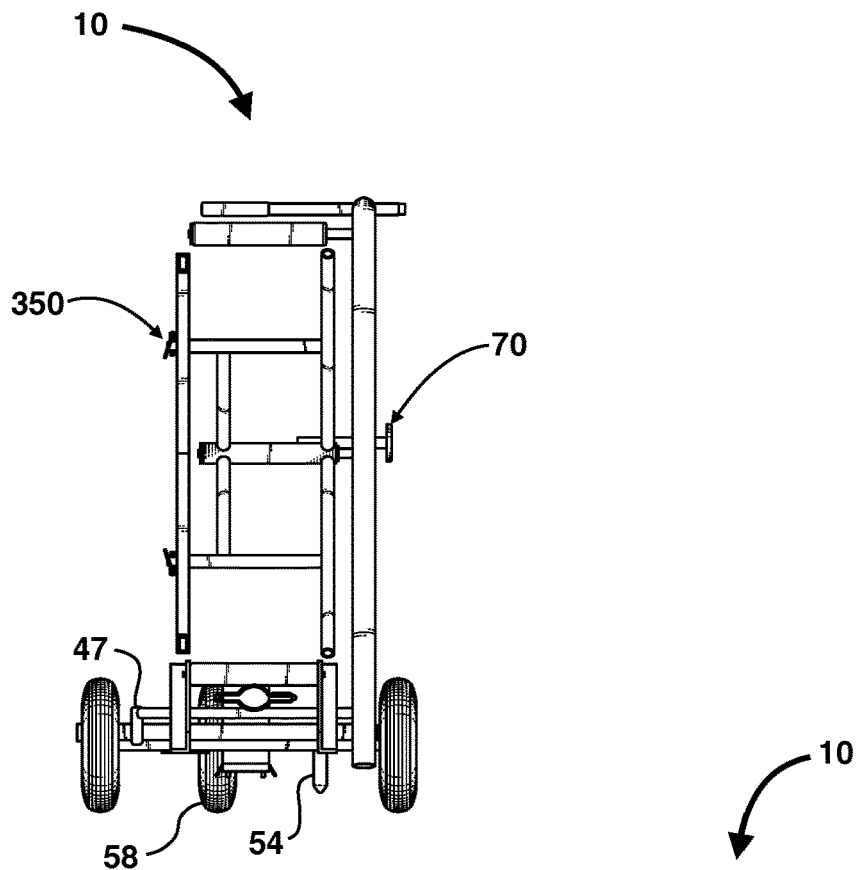
FIG. 3 is a front view of the cart of FIG. 1.
Figure 4:
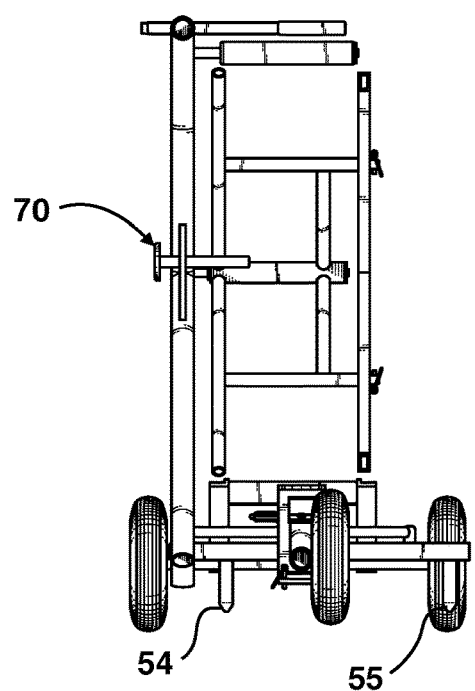
FIG. 4 is a back view of the cart of FIG. 1.

FIG. 3 is a front view of the cart of FIG. 1. The brake assembly 70 is engaged to prevent the rotating enclosure assembly from rotating and the adjustment mechanism is in a locked position, which puts the cart into a mobile state. The mobile state can be discerned because spike 54 is positioned higher than the bottom of the back wheel 58. In FIG. 3, a lynchpin 350 is illustrated as a fastener for the removable side to become removably fastened to the cage. FIG. 4 is a back view of the cart of FIG. 1 illustrating a second spike 55 positioned in line with one of the front wheels. Again, the cart 10 is in a mobile state and the brake assembly 70 is engaged.

Figure 5:
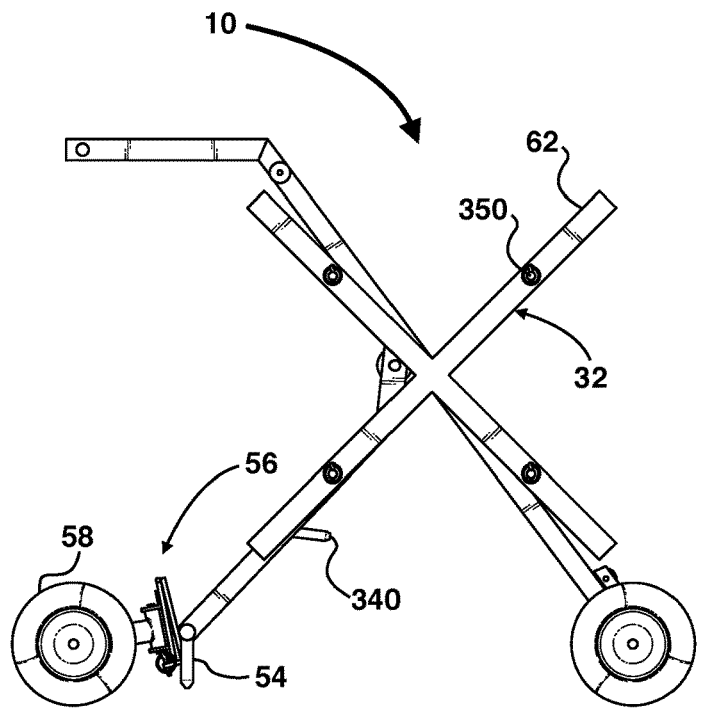
FIG. 5 is a left view of the cart with respect to FIG. 1.
Figure 6:
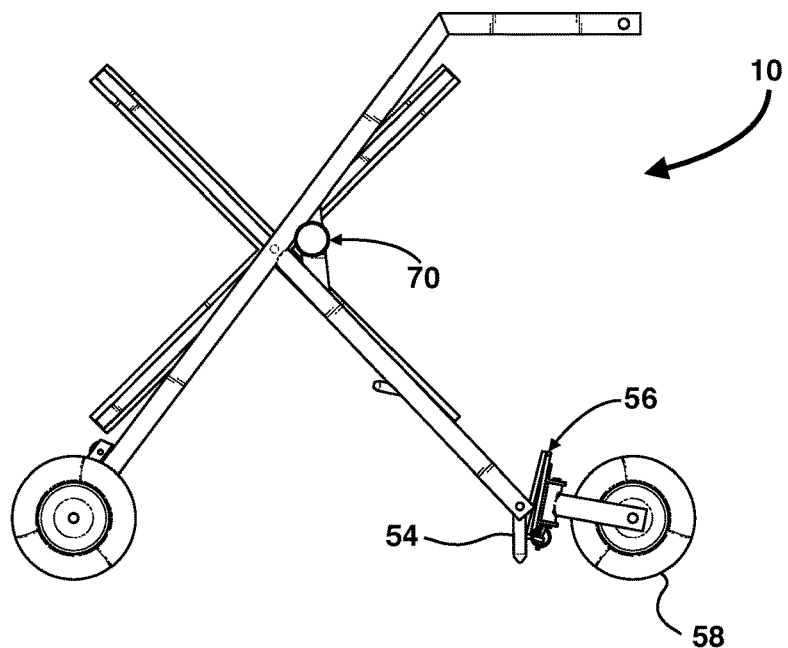
FIG. 6 is a right view of the cart with respect to FIG. 1.

FIG. 5 is a left view of the cart with respect to FIG. 1 illustrating the anchor 340 attached to one of the longer radial spokes (not visible). In addition, removable side fastener 350 is shown fastening the removable side 32 to the cage (not visible). The cart is in a mobile state since the adjustment mechanism 56 is in a locked state. When the cart is in a mobile state, spike 54 is higher than the bottom of wheel 58. FIG. 6 is a right view of the cart with respect to FIG. 1 illustrating the cart in a mobile state with the brake assembly 70 engaged.

Figure 7:
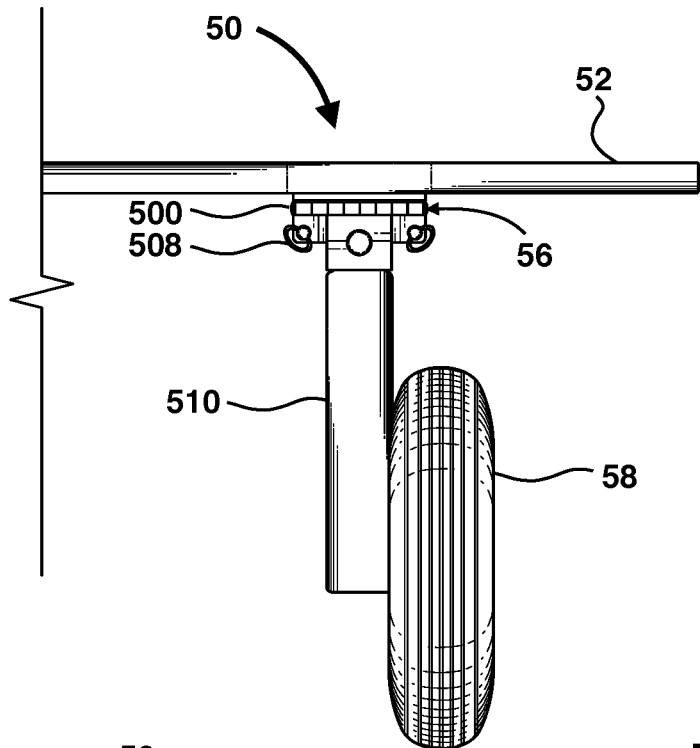
FIG. 7 is a top view of a back assembly of the cart.
Figure 8:
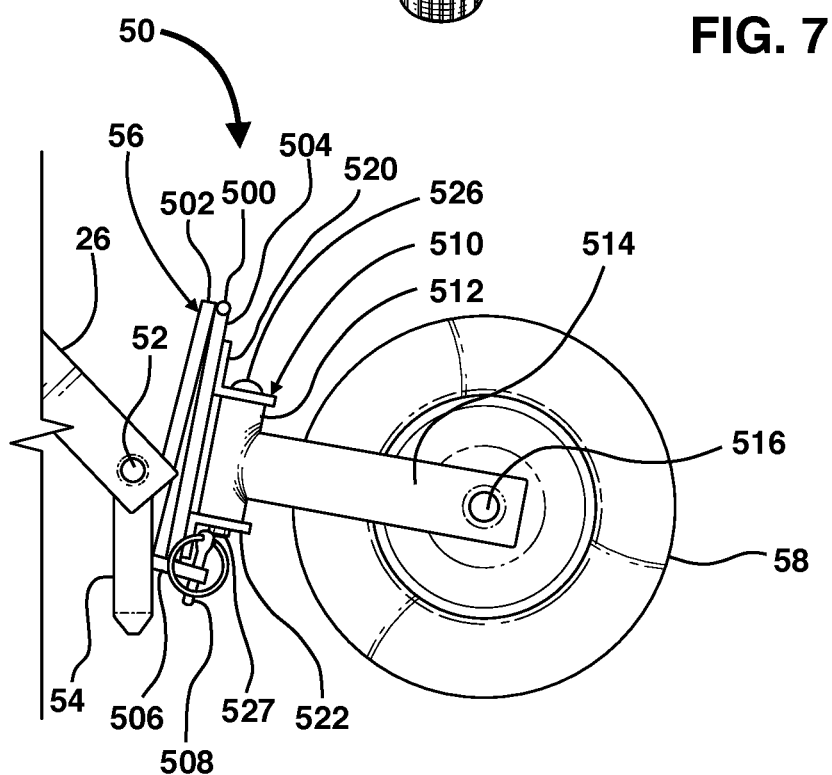
FIG. 8 is a side view of the back assembly illustrating an adjustment mechanism in a locked position resulting in the cart being in a mobile state.

FIG. 7 is a top view of one embodiment for the back assembly 50 of the cart and FIG. 8 is a side view of the back assembly 50, both illustrating the adjustment mechanism 56 in a locked position, meaning the cart is mobile and the spike is not inserted into the ground. In the embodiment shown in FIGS. 7 and 8, the adjustment mechanism 56 is attached to the support bar 52. The adjustment mechanism 56 includes a hinge 500 connecting a back plate 502 and a front plate 504 with the back plate 502 being attached at its bottom to a support plate 506. Support plate 506 includes a hole into which a locking pin 508 may be inserted to prevent the front plate 504 from moving away from the back plate 502. When the locking pin 508 is inserted into the support plate 506, the adjustment mechanism in the locked position. The back assembly 50 further includes a steering mechanism 510. The steering mechanism includes a pivot element 512, a pivot arm 514, and a back axle 516. Back wheel 58 is attached to one end of back axle 516. The steering mechanism 510 further includes a top bracket 520 and a bottom bracket 522, both affixed to the front support plate 504. Pivot arm 514 is attached to the pivot element 512, which is attached to the top and bottom brackets 520, 522 in a manner that allows the pivot arm 514 to move horizontally resulting in a corresponding movement of the wheel 58, thereby steering the cart. In one embodiment, the pivot element 512 may be attached to the top and bottom brackets 520, 522 using a bolt 526 through the pivot element 512 with a locking nut 527 on the bottom. It is envisioned that the other mechanisms, too numerous to enumerate, may be designed for the adjustment mechanism, all of which are included within the scope of the present claimed invention.

Figure 9:
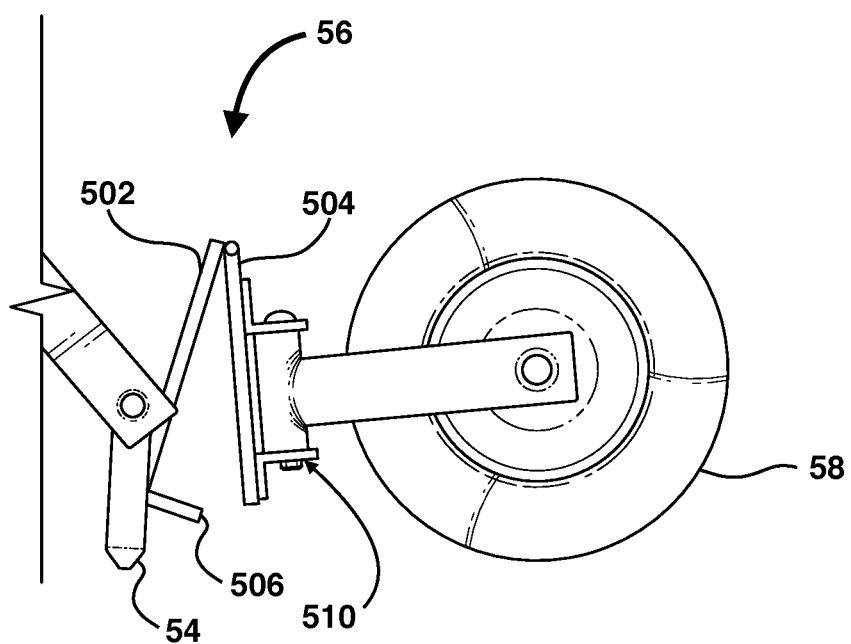
FIG. 9 is a side view of the back assembly illustrating the adjustment mechanism in an unlocked position resulting in the cart being in a stationary state.

FIG. 9 is one embodiment of a side view of the back assembly illustrating the adjustment mechanism 56 when the cart is in a stationary state (e.g., spike 54 is in the ground). When the cart is in the stationary state, the adjustment mechanism allows wheel 58 to float upwardly so that the immobilizer (e.g., spike 54) can contact the ground. Once the locking pin is removed from the support plate 506, hinge 500 allows the front plate 504 to move away from the stationary back plate 502. As the front plate 504 moves, the pivot arm correspondingly moves upwardly resulting in the back wheel 58 floating upwardly. When the cart is in the stationary state, the bottom of spike 54 is lower than the bottom of wheel 58.

Figure 10:
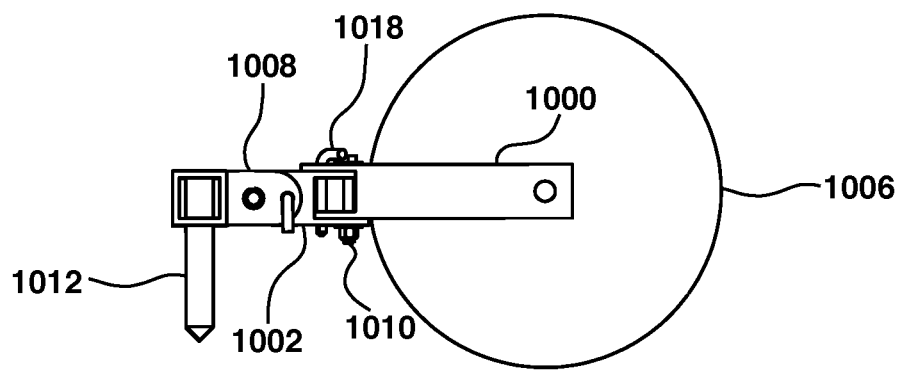
FIG. 10 is a side view of another embodiment for the back assembly illustrating another embodiment of an adjustment mechanism in a locked position resulting in the cart being in a mobile state.
Figure 11:
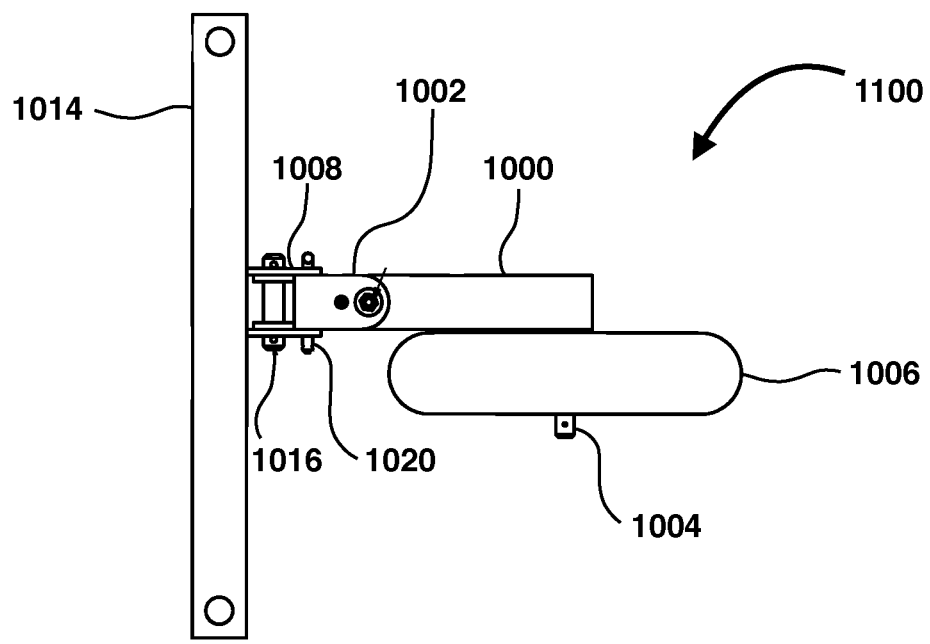
FIG. 11 is a top view of another embodiment for a back assembly of a cart.

FIG. 10 is a side view of another embodiment for the back assembly illustrating another embodiment of an adjustment mechanism in a locked position resulting in the cart being in a mobile state. FIG. 11 is a top view of the back assembly of the cart shown in FIG. 10. The back assembly 1100 includes a rear castor shaft 1016 that allows the rear caster arm 1000 to move upwardly or downwardly based on whether the immobilizers 1012 (e.g, anchor spikes in the embodiment shown) are out of the ground or pushed into the ground. The movement of the caster arm 1000 allows the tire 1006 to adjust accordingly. The back assembly may include a rear castor arm 1000, a rear caster pivot 1002, a rear castor axle 1004, a tire 1006, a rear castor hinge blade 1008, a lock 1010, immobilizers 1012, a rear lower frame 1014, a rear castor shaft 1016, and hitch pins 1018 and 1020.

Figure 12:
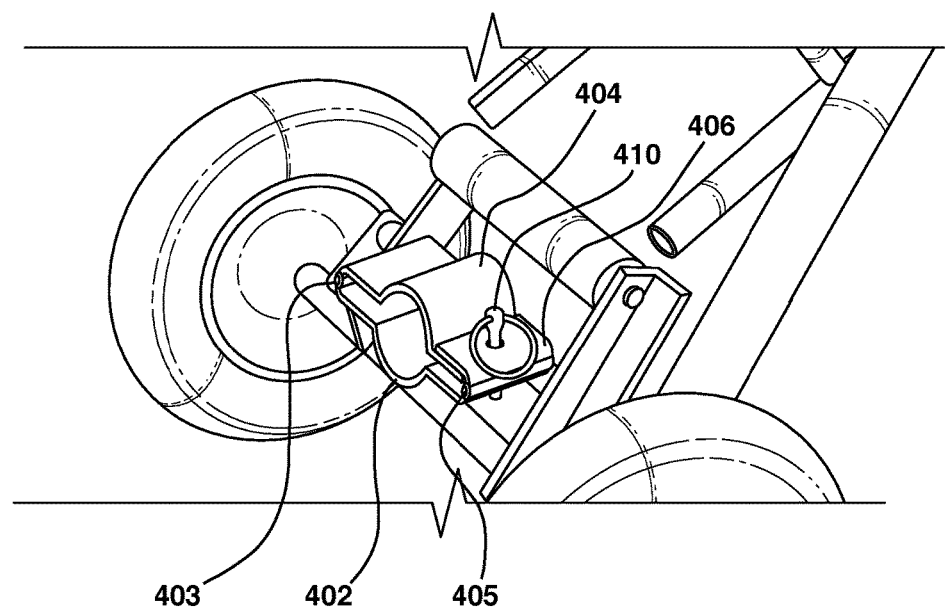
FIG. 12 is a perspective view of a locking apparatus on a front assembly of the cart.

FIG. 12 is a perspective view of one embodiment for a locking mechanism on the front assembly of the cart. The locking mechanism prevents the flexible tubing from moving and thus uncoiling or expanding in the rotating enclosure assembly. With one end of the flexible tubing positioned over the anchor in the rotating enclosure assembly, the flexible tubing can be wound tight and once the tubing is tight, the brake assembly can be engaged to prevent the rotating enclosure assembly from free-wheeling. The locking mechanism then prevents the flexible tubing from becoming loose within the rotating enclosure assembly. The combination of the anchor, brake assembly, and locking mechanism allows the flexible tubing to be easily wound tightly and removed if a different length of flexible tubing is desired for a new installation job. However, the smaller length can be later re-loaded and used for smaller installation jobs. Because the cart can easily manage longer lengths of flexible tubing, independent installers can use longer lengths of flexible tubing without struggling with the unwieldy tubing. This decreases the amount of waste caused when only smaller lengths are used. One embodiment of a locking mechanism includes a stationary bottom clamp 402 hinged via a first hinge 403 to a top clamp 404 and is hinged via a second hinge 405 to a locking clamp 406. When the top clamp 404 closes down onto the bottom clamp 402, an opening is created that is sized to by slightly smaller than the diameter of the flexible tubing. Locking clamp 406 can be positioned over one end of the top clamp and secured with a locking lynchpin 410 through the corresponding holes in the bottom clamp 402, the top clamp 404, and the locking clamp 406, thereby locking the flexible tubing in its current position. Other embodiments for the locking mechanism are envisioned using various mechanisms and design details, each of which prevent the flexible tubing from moving, and thus, uncoiling or expanding in the rotating enclosure assembly. Each of these various configurations are within the scope of the present claims.

Figure 13:
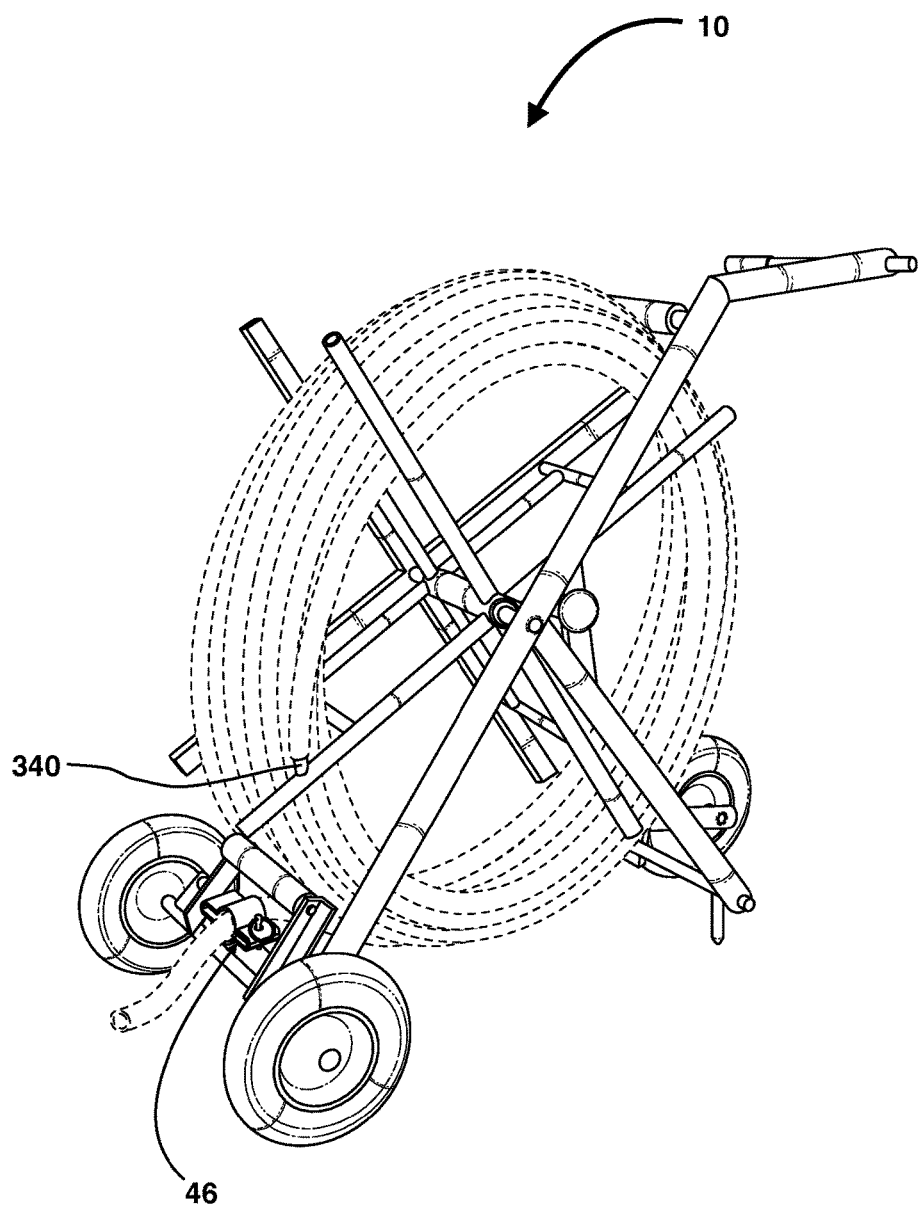
FIG. 13 is a perspective view of the cart loaded with tubing.

FIG. 13 is a perspective view of the cart loaded with tubing. One end of the flexible tubing is placed around anchor 340 and the other end is locked within the locking mechanism 46. In addition, the brake assembly si preventing the rotating enclosure assembly from free wheeling backwards or forwards. Therefore, the cart can now be transported to a new location or can be steered to a new location without difficulty.

Figure 14A:
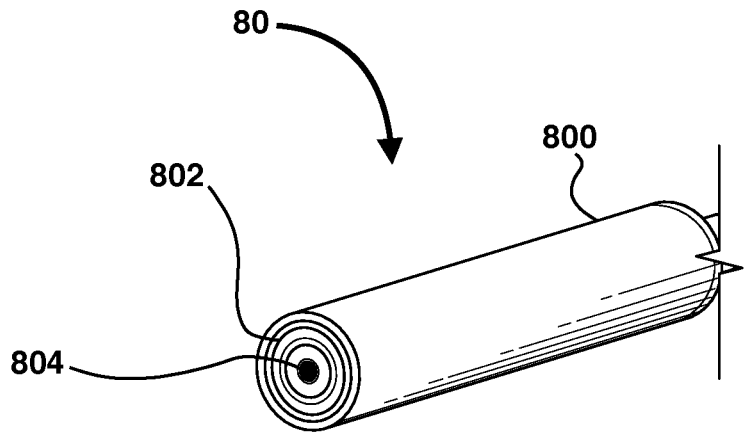
FIGS. 14A-14C are views of a top roller.
Figure 14B:
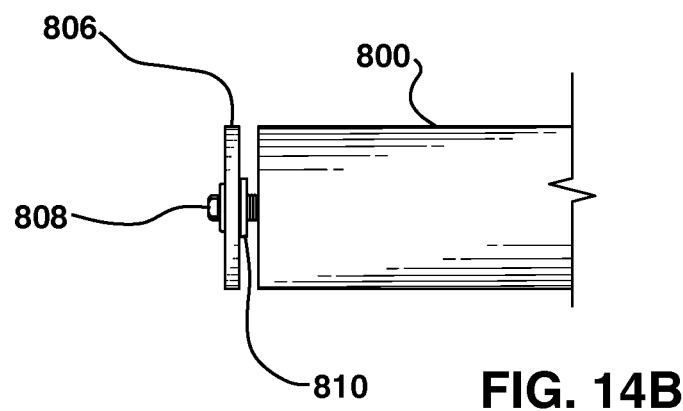
Figure 14C:
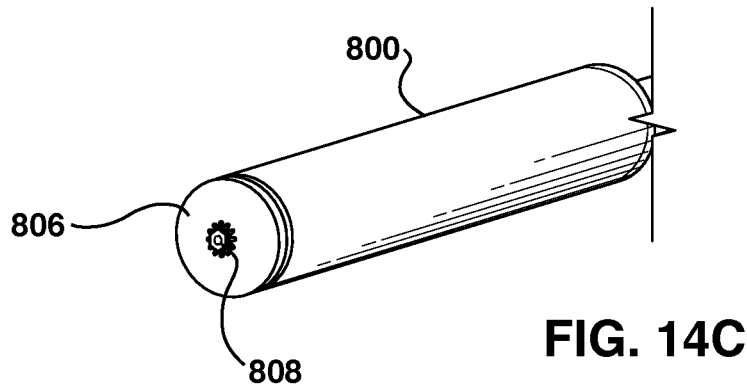

FIGS. 14A-14C are views of the back roller. The back roller includes an outer tube 800 with a bearing 802 fit inside around a roller axle 804. One end of the roller axle may be threaded so that an end cap 806 may be fastened to the roller axle 804 via a bolt 808 and washer 810. The other end of the roller axle may be affixed to the first support member 22 as shown in FIG. 2. The front roller may be built similarly except that the ends may each be attached to one of the front support elements 41 (shown in FIG. 2) instead of using an end cap as shown in FIG. 14B.

Figure 15A:
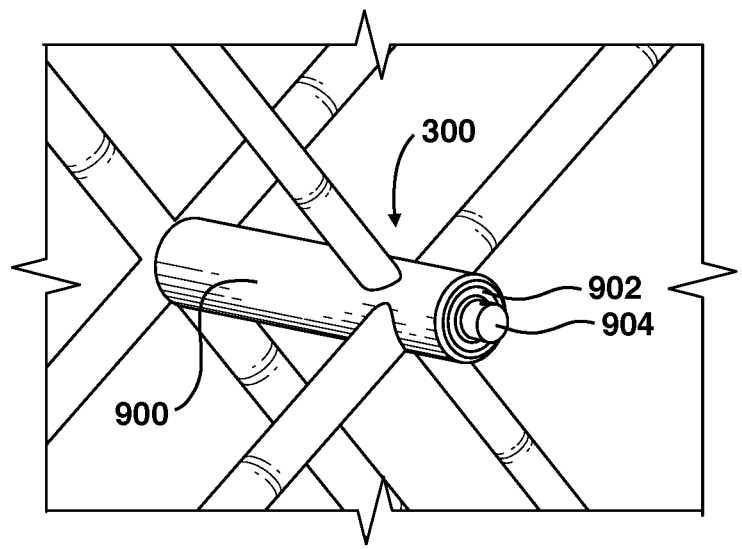
FIGS. 15A-15B are views of some embodiments for a center axle of the rotating enclosure assembly.
Figure 15B:
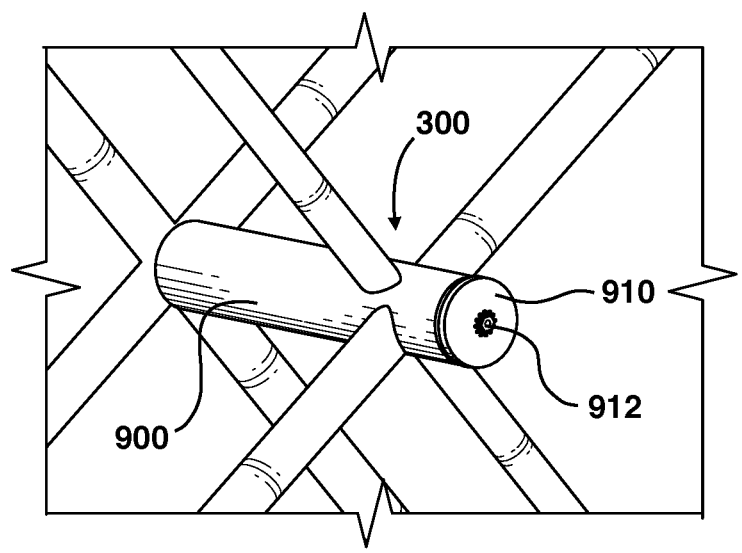

FIGS. 15A and 15B are views of different embodiments of the center axle 300 of the rotating enclosure assembly. The center axle 300 may include a center outer tube 900 with a bearing 902 fit inside around a center axle 904. One end of the center axle 300 is attached to the intersection of the longer radial spokes and the other end of the center axle 300 may be capped with cap 920 and bolt 922 as shown in FIG. 15B. In other embodiment, a retainer may prevent the center axle 300 from slipping out of the center outer tube as shown in FIG. 15A.

Figure 16:
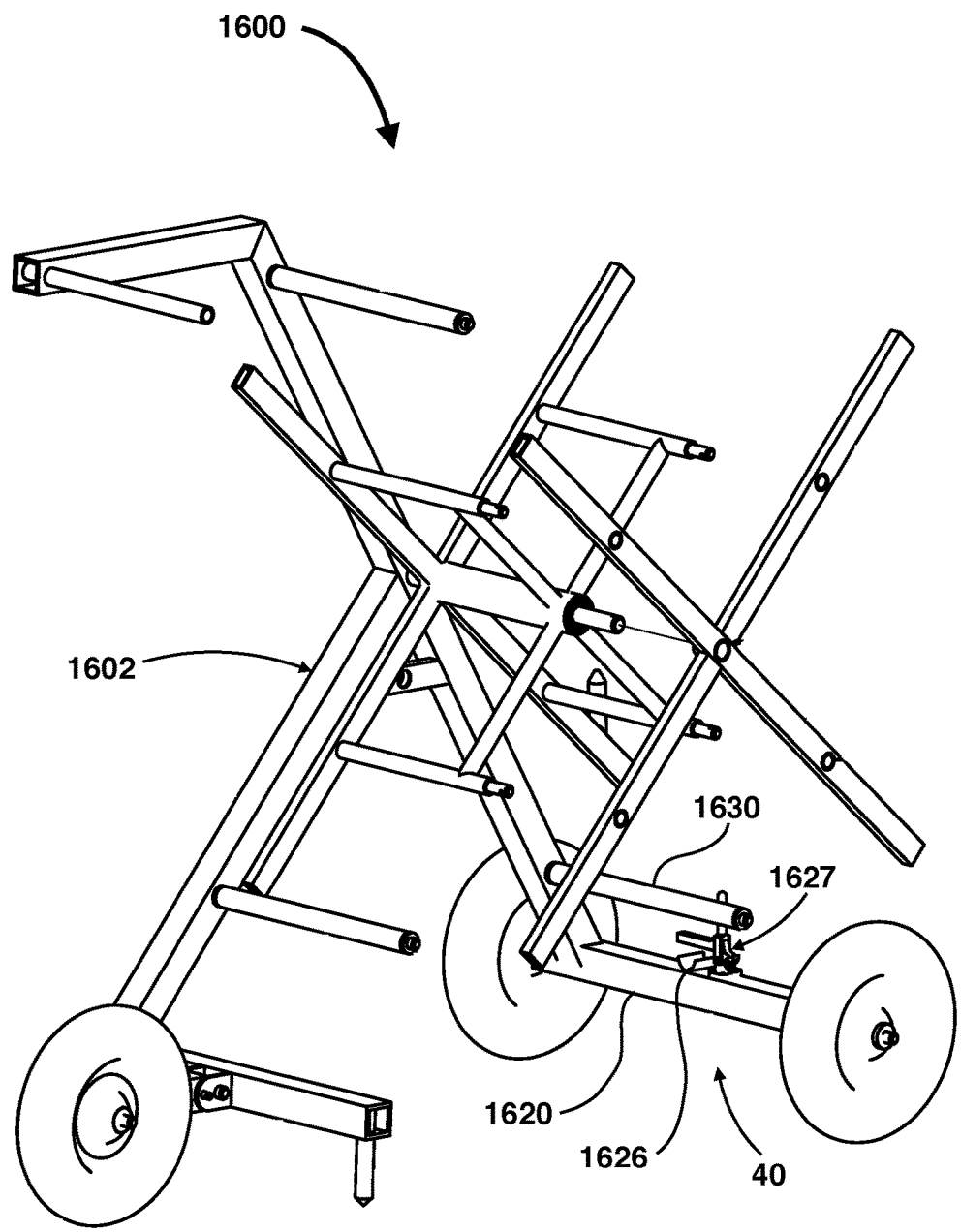
FIG. 16 is another perspective view of one embodiment of a cart illustrating a removable side of a rotating enclosure assembly that allows easy loading of a roll of flexible tubing onto the cart so that the cart can be used for installing flexible tubing in accordance with the principles of the present invention.

FIG. 16 is another perspective view of one embodiment of a cart 1600 illustrating a removable side of a rotating enclosure assembly that allows easy loading of a roll of flexible tubing onto the cart so that the cart can be used for installing flexible tubing in accordance with the principles of the present invention. FIG. 16 illustrates the frame 1602 using rectangular framing in contrast to the cylindrical framing in FIG. 1.

In addition, FIG. 16 illustrates an embodiment of the front assembly 40 that includes a main front axle frame 1620 onto which a tubing guide 1626 and cam lock 1627 are fastened to anchor the flexible tubing to prevent the tubing from movement when the cam lock 1627 is locked. The front assembly 40 includes a rear lower roller shaft 1630 to confine the flexible tubing within the enclosure.

Figure 17:
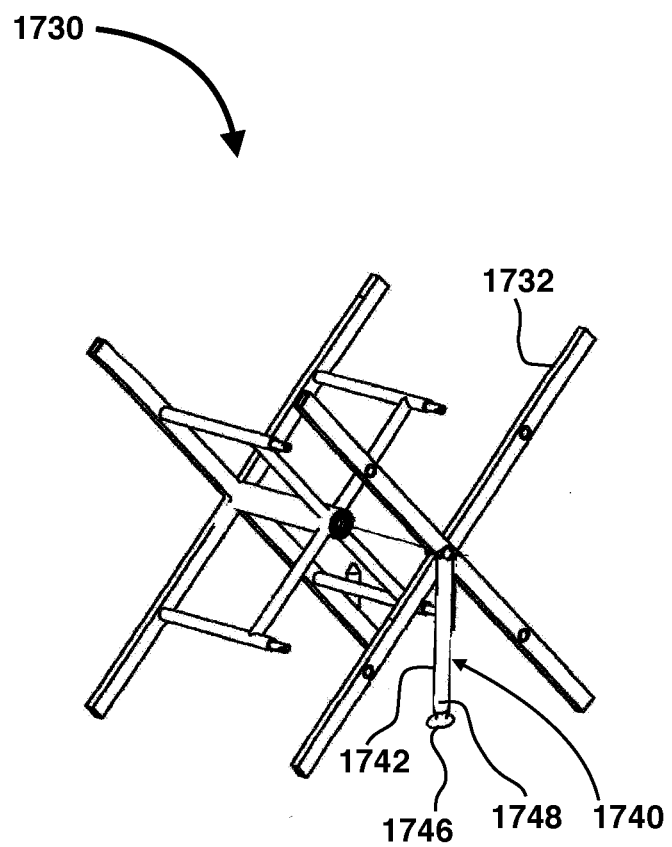
FIG. 17 is a perspective view of one embodiment of a rotating enclosure assembly with a removable side including a travel support member in an operational position.
Figure 18:
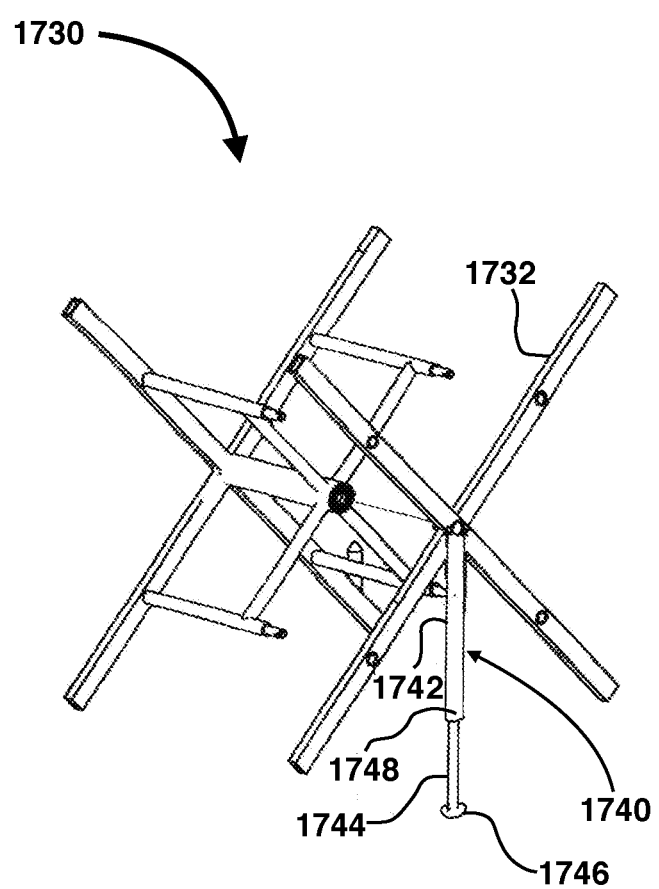
FIG. 18 is a perspective view of one embodiment of a rotating enclosure assembly with a removable side including a travel support member in a travel position.

FIG. 17 is a perspective view of one embodiment of a rotating enclosure assembly 1730 with a removable side 1732 including a travel support member 1740 in a non-support position. FIG. 18 is a perspective view of one embodiment of a rotating enclosure assembly 1730 with a removable side 1732 including a travel support member 1740 in a support position. In one embodiment the travel support member may be fastened near the center of the removable side 1732. The travel support member 1740 may include a first portion 1742, second portion 1744, and a foot 1746. The foot 1746 is attached to the second portion 1744 which may be slideably inserted into the first portion when the cart is in a non-supported position, but may be extended to a length that reaches a support surface (e.g., a bed of a transport vehicle) when the cart is in a support position, such as when being transported from one location to another location. The travel support member provides support to the cart, especially the cage when the cart is loaded with flexible tubing and is being transported on rough terrain. The travel support member 1740 may also be used to provide support to the cart when the cart is on the ground before and/or after use. The first portion and second portion may have various holes into which a pin (e.g., pin 1748) may be inserted to position the travel support member in the non-support position or in the support position. Other mechanisms for positioning and locking the travel support member in the non-support and support positions are also envisioned and are within the scope of the present claims. Likewise, other mechanisms and designs for the travel support member are envisioned, but each within the scope of the present claims.

While the cart may be manufactured using any conventional methods and use any conventional material, in some embodiments, the cart may be manufactured using aluminum in order to keep a minimal weight while still maintaining the strength of the cart. This allows one person to easily maneuver, lift, and transport the cart. In some embodiments, an extra back wheel may be added for additional support if the cart is configured to hold very large and/or heavy flexible tubing. In addition, in some embodiments, tubing may be inserted where elements are attached and welded to make a socket (e.g., round insert) wherever a hole is drilled. The welding of the socket strengthens the attachment. In other embodiments, the cart may be manufactured using steel for durability. Other manufacturing material such as plastic may be used on various parts without departing from the invention. It is envisioned that various configurations of the above described cart may be designed and used in various environments, such as plumbing, landscaping, gardening, and the like.

While the foregoing written description of the invention enables one of ordinary skill to make and use a cart as described above, those of ordinary skill will understand and appreciate the existence of variations, combinations, and equivalents of the described embodiments, methods, and examples herein. Thus, the invention as claimed should therefore not be limited by the above described embodiments, methods, and examples, but by all embodiments and methods within the scope and spirit of the claimed invention.

The claimed invention is:

1. A cart, comprising:
   a frame;
   a front assembly attached to the frame;
   a back assembly attached to the frame; and
   a rotating enclosure assembly attached to the frame, the rotating enclosure assembly comprising a removable side and a cage, wherein the removable side is removable from the cage or fixedly attached to the cage depending on an operation being performed, wherein the cage comprises a center axis, at least two first type of radial spokes, at least two second type of radial spokes, and at least two respective connecting cross members attached to the corresponding pair of first and second type of radial spokes, the center axis having a first end and a second end, wherein the at least two first type of radial spokes are connected to the center axis near the first end and the at least two second type of radial spokes are connected to the center axis near the second end, wherein the connection of the cross member to the second type of radial spoke allows the cross member to extend past the connection a distance forming an end, wherein the removable side comprises at least two removable side spokes, each having a respective removable side aperture through which the end of one of the corresponding cross members protrudes when attaching the removable side to the cage.

2. The cart of claim 1, wherein the front assembly comprises a locking mechanism configured to prevent movement of a portion of a flexible tubing when the portion is locked in the locking mechanism.

3. The cart of claim 2, wherein the front assembly further comprises a front roller configured to confine the flexible tubing coiled around the rotating enclosure assembly.

4. The cart of claim 2, wherein the front assembly further comprises a front axle and two front wheels positioned on opposite ends of the front axle.

5. The cart of claim 1, wherein the back assembly comprises an adjustment mechanism that allows the cart to be adjusted between a mobile state and an immobile state.

6. The cart of claim 5, wherein the back assembly further comprises at least on immobilizer configured to immobilize the cart into the immobile state.

7. The cart of claim 6, wherein the back assembly further comprises a support bar and the immobilizer comprises a stake protruding downwardly from the support bar, the support bar being attached to the frame.

8. The cart of claim 1, wherein the cage includes an anchor for securing an end of a flexible tubing.

9. The cart of claim 1, wherein the frame further comprises a handle portion onto which a handle is attached.

10. The cart of claim 1, further comprising a back roller attached to the frame, the back roller being configured to confine flexible tubing coiled around the rotating enclosure assembly.

11. The cart of claim 1, wherein the cart further comprises a brake assembly configured to prevent the rotating enclosure assembly from free-wheeling in a forward direction or in a backward direction.

12. The cart of claim 1, wherein the first type of radial spoke is longer than the two second type of radial spoke.

13. The cart of claim 1, wherein a length of the first type of radial spoke and the removable side spoke are the same to contain a flexible hose between the first type of radial spoke and the removable side spoke when winding or unwinding a flexible hose.

14. The cart of claim 1, wherein the connection of the cross member to the second type of radial spoke is positioned at the end of the second type of radial spoke and the connection of the cross member to the first type of radial spoke generally midway on the first type of radial spoke.

15. The cart of claim 1, wherein the location that the second type of radial spoke is connected to the center axis near the second end allows the removable side to be attached to the cage without interference between the center axis and the removable side.

16. A cart, comprising:
a frame;
a front assembly attached to the frame, wherein the front assembly further comprises a front axle and two front wheels positioned on opposite ends of the front axle;
a back assembly attached to the frame; and
a rotating enclosure assembly attached to the frame, the rotating enclosure assembly comprising a removable side and a cage, wherein the removable side is removable from the cage or fixedly attached to the cage depending on an operation being performed and wherein an axis of rotation of the rotating enclosure assembly is in the same direction as the rotation of the wheels, wherein the cage comprises a center axis, at least two first type of radial spokes, at least two second type of radial spokes, and at least two respective connecting cross members attached to the corresponding pair of first and second type of radial spokes, the center axis having a first end and a second end, wherein the at least two first type of radial spokes are connected to the center axis near the first end and the at least two second type of radial spokes are connected to the center axis near the second end, wherein the connection of the cross member to the second type of radial spoke allows the cross member to extend past the connection a distance forming an end, wherein the removable side comprises at least two removable side spokes, each having a respective removable side aperture through which the end of one of the corresponding cross members protrudes when attaching the removable side to the cage.

* * * * *